(12) United States Patent
Morton

(10) Patent No.: US 7,109,366 B2
(45) Date of Patent: Sep. 19, 2006

(54) COMPOSITIONS FOR REMOVING METAL IONS FROM AQUEOUS PROCESS SOLUTIONS AND METHODS OF USE THEREOF

(75) Inventor: Peter Morton, East Palo Alto, CA (US)

(73) Assignee: Canadus Technologies LLC, Warrensville Heights, OH (US)

( * ) Notice: Subject to any disclaimer, the term of this patent is extended or adjusted under 35 U.S.C. 154(b) by 0 days.

(21) Appl. No.: 10/976,375

(22) Filed: Oct. 29, 2004

(65) Prior Publication Data
US 2005/0061748 A1    Mar. 24, 2005

Related U.S. Application Data

(62) Division of application No. 10/212,028, filed on Aug. 1, 2002, now Pat. No. 6,843,923.

(60) Provisional application No. 60/309,836, filed on Aug. 3, 2001, provisional application No. 60/309,837, filed on Aug. 3, 2001, provisional application No. 60/309,854, filed on Aug. 3, 2001.

(51) Int. Cl.
*C07F 9/02*     (2006.01)
*C07F 7/00*     (2006.01)
*C07F 1/00*     (2006.01)
*C02F 1/42*     (2006.01)

(52) U.S. Cl. ............ 556/77; 556/107; 556/116; 210/688; 534/15

(58) Field of Classification Search ............ 556/77, 556/107, 116; 210/688; 534/15
See application file for complete search history.

(56) References Cited

U.S. PATENT DOCUMENTS

| | | | |
|---|---|---|---|
| 1,855,035 A | 4/1932 | Vignos | 252/149 |
| 3,951,790 A | 4/1976 | Fujisawa et al. | 210/38 B |
| 3,966,601 A | 6/1976 | Stevenson et al. | 210/53 |
| 4,032,416 A | 6/1977 | Cutler | 204/79 |
| 4,048,416 A | 9/1977 | Axen et al. | 526/9 |
| 4,053,400 A | 10/1977 | Merker et al. | 204/49 |
| 4,133,755 A | 1/1979 | Tarao et al. | 210/38 B |
| 4,239,865 A | 12/1980 | Tarao et al. | 525/327 |
| 4,971,775 A | 11/1990 | Hoy et al. | 423/140 |
| RE34,272 E | 6/1993 | Michaud et al. | 156/637 |
| 5,492,620 A | 2/1996 | Evans | 210/96.1 |
| 5,578,195 A | 11/1996 | Tissler et al. | 208/146 |
| 5,615,862 A | 4/1997 | Gaudette | 252/175 |
| 5,649,895 A | 7/1997 | Fix et al. | 588/256 |
| 5,665,324 A | 9/1997 | Izawa et al. | 423/308 |
| 5,772,776 A | 6/1998 | Holbein | 134/2 |
| 5,908,559 A | 6/1999 | Kresiler | 210/710 |
| 5,969,019 A | 10/1999 | Kanai et al. | 524/140 |
| 6,274,045 B1 | 8/2001 | Kreisler | 210/710 |
| 6,521,131 B1 | 2/2003 | Hamilton et al. | 210/662 |
| 2006/0060538 A1* | 3/2006 | Morton | 210/688 |

FOREIGN PATENT DOCUMENTS

| | | |
|---|---|---|
| CN | 1069008 | 2/1993 |
| EP | 0116989 | 8/1984 |
| JP | 52094888 | 8/1977 |
| JP | 53015283 | 2/1978 |
| JP | 53149189 | 12/1978 |
| JP | 52061124 | 5/1997 |
| JP | 9066275 | 11/1997 |
| JP | 2001288579 | 10/2001 |
| KR | 8501079 | 7/1985 |
| SU | 1727054 A1 | 4/1992 |

OTHER PUBLICATIONS

Victoriano et al., Inorg. Chem., vol. 37, No. 8, pp. 2060-2062 (1998).*
Chung Chieh., Canadian Journal of Chemistry, vol. 55, No. 7, pp. 1115-1119 (1977).*
Contreras et al., J. Inorg. Nucl. Chem., vol. 33, pp. 1337-1343 (1971).*
Fernandez et al., Inorg. Chem., vol. 37, No. 21, pp. 5532-5536 (1998).*
Yoshida, H. et al., "Extraction of Several Metallic Complexes With Tetraethylthiuram Disulfide", Bunseki Kagaku, 1967, vol. 16(6), pp. 605-607.
Kakowski, I.A., "Reaction Between Disulfides and the Surfaces of Metals", Revista Minelo, 1957, vol. 8, pp. 499-502.
Mendoza, C.S. et al., "Silver Extraction for Pollution Control of Photographic Fixing Solution with Tetramethylthiuram Disulfide", Bulletin of the Chemical Society of Japan, 1996, vol. 69(12), pp. 3499-3504.
Mendoza, C.S. et al., "Thiuram Sulfides as a Reagent for the Solvent Extraction of Silver", Analytical Sciences, 1996, vol. 12(6), pp. 969-972.
Kobayashi, N. et al., "Sulfur-Containing Polymers XIX. Adsorption of Mercury From Aqueous Solutions By Thiuram Polysulfide Polymers", Journal of Polymer Science, Polymer Letters Edition, 1977, vol. 15(3), pp. 137-140.
U.S. Appl. No. 10/211,471, filed Aug. 1, 2002, Inventor: Peter Morton, Title: Process for Reducing the Passive Layer From the Surface of a Metal.
U.S. Appl. No. 10/211,406, filed Aug. 1, 2002, Inventor: Peter Morton, Title: Compositions for Removing Metal Ions From Aqueous Process Solutions and Methods of use Thereof.
Lezzi et al., Chelating Resins Supporting Dithiocarbanate and Methylthiourea Groups in Adsorption of Heavy Metal Ions, 1994 Journal of Applied Polymer Science, vol. 54, pp. 889-897.
EP Search Report dated Oct. 5, 2005.

* cited by examiner

*Primary Examiner*—Porfirio Nazario-Gonzalez
(74) *Attorney, Agent, or Firm*—Michael E. Dergosits; Dergosits & Noah LLP

(57) ABSTRACT

The present invention provides a composition and process using the composition for removing metal ions from aqueous process solutions. These compositions include a non-metallic compound and a suitable carrier. In one embodiment, the non-metallic compound is a thiuram. In another embodiment, the non-metallic compound can further include a dithiocarbamate. These compositions are contacted with the metal ions in the aqueous process solution having a wetting agent to form an organometallic complex precipitate. The precipitate can then be separated from the aqueous solution.

10 Claims, No Drawings

COMPOSITIONS FOR REMOVING METAL IONS FROM AQUEOUS PROCESS SOLUTIONS AND METHODS OF USE THEREOF

CROSS-REFERENCE TO RELATED APPLICATION

The present application is a divisional of application Ser. No. 10/212,028 filed on Aug. 1, 2002, issued as U.S. Pat. No. 6,843,923, which claims priority to U.S. provisional patent application Nos. 60/309,836, 60/309,837 and 60/309,854, all filed on Aug. 3, 2001, which are all incorporated herein by reference in their entirety.

FIELD OF INVENTION

The present invention describes a composition and process using the composition for removal of metal ions from aqueous process solutions.

BACKGROUND OF THE INVENTION

Various metals are used in many useful industrial processes. For example, silver is used in many image-forming industrial processes, such as photography, thermography, and photothermography. Such processes, however, result in waste solutions containing metal ions at levels that may be undesirable to the environment. In addition, many countries now have laws that control the levels of certain metal ions that can be released into the environment. Since commercial disposal of large volumes of untreated waste solutions can be costly, there has been a concerted effort to treat the waste solutions in a cost effective manner. Furthermore, these metals can be of sufficient value to justify their recovery.

Metals have been removed from aqueous waste solutions utilizing processes such as ion exchange, electrolysis, and settling. However, all of these known processes have their limitations. Ion exchange is costly, slow and impractical. The ion exchange resins are expensive because they require complex and sophisticated fabrication processes. Some of this cost can be recouped by regenerating the ion exchange resins. However, the waste solutions produced during regeneration typically have to be treated. Similarly, electrolysis is also costly due to maintenance, resource requirements, and energy input. Electrolysis is also very sensitive to contaminants and generally provides ineffective levels of metal recovery.

Settling processes typically use one or more agents that transform the metals into materials that are no longer soluble in the system and settle to the bottom of the tank. However, currently known settling processes have the following limitations. Undesirably large amounts of sludge, which cannot be regenerated, can be formed. Some settling processes require heating to very high temperatures, e.g., greater than 80° C., to provide useful results. Still others require the use of a change in pH to cause the transformation of the metal into an insoluble material.

Accordingly, there is a need for effective recovery of metal ions from aqueous waste solutions (hereafter also referred to as aqueous process solutions).

SUMMARY OF THE INVENTION

The present invention is directed to a process that effectively removes metal ions from aqueous process solutions. The process includes (i) reacting metal ions in an aqueous process solution having a wetting agent with a treatment composition having a non-metallic compound to form an organometallic complex precipitate, and (ii) separating the organometallic complex precipitate from the aqueous process solution. The reacting step is preferably conducted at a temperature of less than or equal to about 50° C. The process is preferably conducted at a pH of greater than or equal to about 3.0. In one embodiment, the treatment composition includes a non-metallic compound that is a thiuram. In another embodiment, the treatment composition further includes an additional non-metallic compound that is a dithiocarbamate.

The present invention is also directed to a product obtained from the processes described above.

DETAILED DESCRIPTION OF THE INVENTION

The present invention provides a process for removing metal ions from aqueous process solutions. The term "aqueous process solution," as used herein, means any liquid containing from about 1 ppm to about 15,000 ppm of metal ions. The term "about," as used herein, means plus or minus 10% of the referenced value. The term "aqueous", as used herein, means containing greater than about 50%, by weight of the solution, of water or a water miscible solvent. The processes used herein for aqueous process solutions can also be used for appropriate gaseous process mixtures. Nonlimiting examples of aqueous process solutions include the processing solutions from the following technologies: photography, photothermography, thermography, lithography, metallurgy, semiconductor polishing, and x-ray imaging. The term "metal ion," as used herein, means the soluble form of any metal in Groups IB through VIIB and VIII of the periodic table (according to CRC Handbook of Chemistry and Physics, 62nd Edition, 1981–1982), including the elements having the atomic numbers of 58–71 and 90–103, aluminum, gallium, indium, thallium, germanium, tin, lead, antimony, bismuth, mixtures thereof, and alloys thereof. Metal ions of particular interest are those identified in the Resource Conservation Recovery Act (RCRA). The metal ions are preferably selected from the group consisting of arsenic, barium, cadmium, chromium, cesium, copper, iron, lead, mercury, nickel, selenium, silver, technetium, thallium, zinc, actinides, lanthanides, mixtures thereof, and alloys thereof.

The present invention is directed to a method or process of reacting a treatment composition having a non-metallic compound with metal ions in an aqueous process solution having a wetting agent to form an organometallic complex precipitate, and separating the organometallic complex precipitate from the aqueous process solution. The organometallic complex may be separated by any technique or process known to the skilled artisan, e.g., settling, filtration, centrifugation, etc. Treated aqueous process solutions can have less than about 100 ppm, preferably less than about 20 ppm, and more preferably less than about 5 ppm of metal ions.

It has been surprisingly found that the processes of the present invention can effectively remove metal ions to these low levels even in the presence of high concentrations of chelators. Chelators are typically used to maintain the metal ions in the process solution, thereby hindering their removal. The present process can be utilized to effectively remove metal ions in process solutions having chelator to metal ion numeric proportions of greater than about 500:1. In fact, the present process can also be effective in any of the following chelator to metal ion numeric proportions: from about 1,250,000:1 to about 10:1; from about 500,000:1 to about 20:1; and from about 100,000:1 to about 100:1.

The treatment compositions of the present invention include from about 1.0% to 100%, preferably from about by 50% to about 99.99%, by weight of the composition, of a non-metallic compound, which associates with the metal ion, and from 0.0% to about 99.0%, preferably from about by 0.01% to about 50%, by weight of the composition, of an appropriate carrier. The non-metallic compound is preferably not a polymer. The treatment compositions can be provided in dry or liquid forms. Accordingly, the carrier can be any liquid or solid material known to the skilled artisan that is either neutral in its effect or enhances one or more properties of the non-metallic compound and its use, e.g., storage and handling properties. An example of an appropriate carrier is mineral oil.

In one embodiment of the present invention, the treatment compositions of the present invention include a non-metallic compound that is a thiuram, which can also be referred to as thiram. The thiuram is sparingly soluble in the aqueous process solution. The term "sparingly soluble," as used herein, means that less than 0.1% by weight of the material is soluble in the aqueous process solution. Without wanting to be limited by any one theory, it is believed that the non-metallic compounds of the present invention form an organometallic complex with the metal ion. The organometallic complex becomes a precipitate that can be separated from the aqueous solution by any separation technique or method known to the skilled artisan. Nonlimiting separation techniques or methods include filtration, gravity settling, centrifugation, flocculation, cake filtration, membrane filtration, and floatation (liquid/air filtration).

One group of thiurams can be characterized by the general chemical formula (I), as illustrated below.

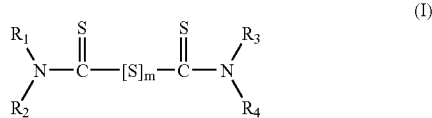

(I)

wherein, m is an integer of 1 or 2; and $R_1$, $R_2$, $R_3$, and $R_4$ are individually selected from the group consisting of C1–C10 linear alkyls, C3–C10 branched alkyls, C3–C10 cyclo-alkyls, and substituted and unsubstituted aryls. As is well known to the skilled artisan, any of the carbon atoms or hydrogen atoms in each of the above described R-groups can be substituted with chemical moieties that tailor the performance of the non-metallic compound without significantly effecting the requisite solubility properties.

Examples of useful non-metallic compounds of formula (I) include, but are not limited to, tetramethylthiuram monosulfide (CAS# 97-74-5); bis(dimethyldithiocarbamoyl) disulfide (CAS# 137-26-8); tetrabenzylthiuram disulfide (CAS# 10591-85-2); tetraethylthiuram disulfide (CAS# 97-77-8); tetrabutylthiuram disulfide (CAS# 1634-02-2); dipentamethylenethiuram tetrasulfide (CAS# 120-54-7), and mixtures thereof.

In another embodiment of the present invention, the treatment compositions of the present invention further include a water soluble, non-metallic compound that is a dithiocarbamate. One group of dithiocarbamates can be characterized by the general chemical formula (II), as illustrated below.

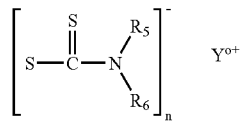

(II)

wherein, n is an integer of 1 or 2; o is an integer of 1 or 2; $R_5$ and $R_6$ are individually selected from the group consisting of C1–C10 linear alkyls, C3–C10 branched alkyls, C3–C10 cyclo-alkyls, and substituted and unsubstituted aryls; and Y is an element selected from Groups IA and IIA of the periodic table. As is well known to the skilled artisan, any of the carbon atoms or hydrogen atoms in each of the above-described R-groups can be substituted with moieties that enhance the performance of the non-metallic compound.

Examples of useful non-metallic compounds of formula (II) include, but are not limited to, sodium dimethyldithiocarbamate (CAS# 128-04-1), sodium diethyldithiocarbamate (CAS# 148-18-5), sodium dibenzyldithiocarbamate (CAS# 55310-46-8), sodium dibutyldithiocarbamate (CAS# 136-30-1), and mixtures thereof.

The aqueous process solution also has a wetting agent in a concentration from about 0.01 molar to 10 molar, more preferably from about 0.025 molar to 0.5 molar, and most preferably from about 0.05 molar to 0.25 molar. Some process solutions may already have a wetting agent as a component of the waste stream. For example, photographic waste solutions typically contain wetting agents in sufficient concentration. If the aqueous process solution does not contain a wetting agent, an appropriate amount of a wetting agent may be added. Wetting agents, also known as surfactants, are compounds that reduce the surface tension of liquids, or reduce interfacial surface tension between two liquids or a liquid and a solid. It is, therefore, believed that the wetting agent helps to lower the barrier of reaction. Wetting agents may be soluble in both organic and water solutions. However, it is preferred that the wetting agents used herein be at least soluble in the aqueous solution at the concentrations used. General categories of useful wetting agents include, but are not limited to, non-ionic surfactants, anionic surfactants, cationic surfactants, carboxylic acids, alcohols, and amines. Zwitter-ionic and amphoteric surfactants may also be useful. Examples of useful wetting agents are disclosed in the Kirk-Othmer Encyclopedia of Chemical Technology (John Wiley and Sons, New York), U.S. Pat. No. 6,399,676 issued to Labude, et al. on Jun. 4, 2002, and U.S. Pat. No. 6,087,312 issued to Masotti, et al on Jul. 11, 2000, all of which are incorporated herein by reference in their entirety. Examples of useful wetting agents include, but are not limited to, acetic acid, propanoic acid, methanol, ethanol, propanol, tetraethyl ammonium hydroxide, fatty acids and salts thereof, alkylaryl sulfonates, and mixtures thereof.

The present process can be conducted at a wide variety of reaction variables, which can be tailored for optimization accordingly to any particular process. As in any chemical reaction, increasing the reaction or retention time, i.e., duration of physical contact of the non-metallic compound and the aqueous process solution, is beneficial to increasing the quantity and/or size of the precipitated organometallic complex. Accordingly, it is preferred to maximize the reaction or retention time as much as allowable taking into consideration other process and economic variables. Typically, the reaction or retention time is at least 0.1 hours, preferably from about 0.5 hours to about 125 hours, and more preferably from about 1 hour to about 10 hours. As is well understood by the skilled artisan, lower reaction or retention times can be needed at higher reaction temperatures.

The reaction can be conducted at a wide range of temperatures. Preferably, the reaction temperature is less than or equal to about 50° C., more preferably less than or equal to about 45° C., and most preferably at ambient temperatures. Ambient temperatures, as used herein, means the normal temperature range of the surrounding environment, which typically can range about from 5° C. to about 40° C. The processes of the present invention, therefore, can be conducted with little or no heating, thereby decreasing the cost of heat inputs to the system. However, a small amount of heating to achieve reaction temperatures within the above ranges may be desirable to achieve optimum processing results.

Since at least some of the non-metallic compounds in the treatment composition are sparingly soluble in the aqueous process solutions, it is preferred to employ any of the known mixing technologies during and after the initial reaction. As is well known to the skilled artisan, however, introduction of air into a system, having a minority of hydrophobic components in a majority of hydrophilic components, can result in an emulsion. Such emulsions typically form a layer on top of the hydrophilic phase. The emulsion layer can be removed by utilizing any technology or process known in the art, e.g., skimming technology. If technology like skimming is not employed in the separation step, the formation of an emulsion layer can be prevented by minimizing the introduction of air into the system after the treatment composition is added to the aqueous solution. For example, mixing can be controlled to prevent the formation of a vortex, which introduces air into the system, by placing a blade in an off-center position at the bottom of the tank. Alternatively, the tank can have a floating top that significantly reduces the amount of air on top of the mixture in the tank.

Lastly, the present process can be conducted at a wide range of pH's, especially if the process is conducted in a substantially oxygen-free environment. However, due to the increased possibility of organic materials being degraded by oxidized metal ions in oxygen rich environments, e.g., Fenton's reaction, it is preferred to conduct the process at a pH of greater than or equal to about 3.0, preferably from about 4.0 to 12.0, and more preferably from about 7.0 to 12.0. It is also believed that the present processes provide better separation of metal ions at lower surface tensions, e.g., at about the surface tension of 1% by weight of acetic acid in water.

In one embodiment of the present invention, the process involves introducing the treatment compositions of the present invention to the aqueous process solution in batch or continuous systems. Such systems can be run in parallel and/or in series. Such systems typically utilize a container, such as a tank, containing the aqueous process solution, and the container is adapted to provide mixing, e.g., by utilizing any mixing technology known to the skilled artisan. The treatment composition is added in a concentration that is proportional to the metal ions present in the aqueous process solution by any well-known method of addition, e.g., by metering. In this embodiment, the treatment composition is added so that the non-metallic compound is at a concentration of from about 1.0:1.0 to about 1.0:4.0, preferably from about 1.0:1.2 to about 1.0:3.0, and more preferably from about 1.0:1.5 to about 1.0:2.5 by molar ratio of the non-metallic compound to the metal ions present in the aqueous process solution. Some non-metallic compounds can even be effective at concentration levels of at least $2.5 \times 10^{-3}$% by weight of the aqueous process solution and the non-metallic compound. More of the non-metallic compound may be needed at lower pH's, e.g., below about pH 4, in oxygen rich environments and when higher levels of contaminants are present, e.g., greater than about 5 ppm. Contaminants are any chemical compounds other than the metal ions and water. In addition, an appropriate amount of a wetting agent may be added if the process solution does not contain the required levels described above.

This embodiment also includes a separation step after the completion of the reaction, or after the end of the appropriate reaction or retention time. Any separation technology or method known to the skilled artisan can be used to separate the organometallic complex precipitate from the aqueous process solution, e.g., settling, centrifugation, filtering, and the like. In continuous systems, a separation device can be placed in series to the mixing container. The resulting precipitate can then be further processed, as described hereinafter.

In another embodiment of the present process, the aqueous process solution containing the metal ions can be introduced to a bed of the treatment composition containing the non-metallic compound in powder or bead form. An appropriate amount of a wetting agent may be added if the process solution does not contain the required levels described above. In this embodiment, a reaction bed is packed with the treatment composition, and a flow of aqueous process solution is controlled through the bed via gravity or positive pressure to optimize the reaction or retention time of reaction in relation to other process and economic variables. The reaction bed can be in any acceptable geometric form. Typically, 2 moles of metallic ions will require about 1 mole of non-metallic compound. More of the non-metallic compound may be needed at lower pH's, e.g., below about pH 4, in oxygen rich environments and when higher levels of contaminants are present, e.g., greater than about 5 ppm. The treatment composition in the reaction bed can be replaced when removal of metal ions has reached an unacceptable degree. The resulting precipitate can then be further processed, as described hereinafter.

Optional ingredients known to the skilled artisan can also be used to aid in or optimize any of the process steps described above. For example, flocculating agents can be used to aid in the settling process. Nonlimiting examples of flocculating agents include acrylates. Also, antifoaming agents can also be used in the mixing step, assuming that the degree of agitation is not changed. Nonlimiting examples of antifoaming agents include silicone oils.

As is well understood by the skilled artisan, the processes of the present invention can be used in conjunction with other conventionally known metal ion recovery systems, such as photochemical developer, fixer, and bleach-fix processing solutions utilizing metallic replacement, electrolytic recovery, chemical precipitation, ion exchange and reverse osmosis. For example, the aqueous process solution can first be treated electrolytically before the present process is used. Alternatively, the present process can be used first before electrolytic treatment.

As described above, it is believed that the non-metallic compounds of the present invention react with metal ions to form an organometallic complex. Without wanting to be limited by any one theory, it is believed that the metallic ion associates to one or more sulfur groups on the non-metallic compound via van der Waals forces, ionic forces, delta, and/or sigma bonds. The recovered organometallic complex can, therefore, be further processed to recover the metal ions as native metal by removing these attractive forces by any method known to the skilled artisan. Alternatively, the complexed non-metallic compound can simply be removed by any method known to the skilled artisan. Examples of suitable removal techniques include, but are not limited to, oxidization, degradation, acidification, and flame refining.

EXAMPLES

Example 1

Use of the Treatment Composition with Mixing

Aqueous process solutions containing metal ions can be introduced into a container fitted with a mixing device, and an appropriate amount of a wetting agent may be added if the process solution does not contain the required levels described above. The mixing device may be any apparatus that will fully agitate the liquid. Typical examples include, but are not limited to, mixers, such as Lightin series 10, and pumps, such as Iwaki MD-70 or March model 1A-MD. Once the liquid is transferred into the container, the treatment composition can be added, and the mixture can then be agitated. The reaction is allowed to proceed until the desired concentration of metal ion is achieved. Reaction time to completion is influenced by various factors including temperature, pH, and solution composition.

In particular, silver ion was removed from a photochemical fixer solution having silver ions at about 2000 ppm. The reaction was conducted at a pH of about 7 and at a reaction temperature of about 25° C., as follows. Using a 55-gallon (208 L.) container and a side mounted mixer that allows full mixing of the tank, while minimizing introduction of air into the system, 50 gallons (189 L.) of photochemical fixer solution was added. The concentrations of the individual components in the fixer solution was not easily discernable because the fixer solution was the actual waste stream from a photographic laboratory. However, it was estimated, from the starting compositions used, that the waste fixer solution contained from about 0.01 to about 0.1 molar of acetate, a wetting agent. After turning on the mixer, 2 pounds (0.9 kg.) of pure bis(dimethyldithiocarbamoyl) disulfide (CAS# 137-26-8) in powder form was added. After allowing the reaction to proceed for about four hours, the reaction mixture was allowed to settle for 30 minutes to form a layer at the bottom of a precipitate containing an organometallic complex. The supernatant aqueous solution was tested for silver ions using a Perkin Elmer flame atomic absorption spectrometer. The procedure for using such atomic absorption spectrometers to obtain concentrations of metal ions is well known in the art. The filtered aqueous solution contained less than about 5 ppm of silver ions.

Example 2

Use of the Treatment Composition in a Column

The treatment compositions of the present invention can also be used in a fixed bed reactor, such as a column, by compressing the treatment composition to form pellets or beads having a length or diameter, respectively, from about 2 to about 6 millimeter that can be placed in the fixed bed reactor. Using a column as an example, the column housing may be in the form of a tube with proper connections at both ends to allow the aqueous process solution to enter and exit the column while maintaining the treatment composition pellets in the column. First, an appropriate amount of a wetting agent may be added if the process solution does not contain the required levels described above. Once the treatment composition is added to the column, the aqueous process solution can be slowly pumped into the column. The treated solution leaving the column can then be filtered to yield a precipitate of an organometallic complex containing silver ions. This embodiment can provide treated solutions containing less than about 10 ppm of silver ions by adjusting the flow rate. Adjustment of the flow rate can compensate for other factors that can effect performance, such as the initial silver ion concentration, pH, and other metal ions.

In particular, silver ions were removed from a photochemical fixer solution having silver ions at a concentration of about 2000 ppm. The experiment was conducted at a pH of about 7 and at a reaction temperature of about 25° C., as follows. Using a column large enough to hold about 10 pounds (4.5 kg.) of pure bis(dimethyldithiocarbamoyl) disulfide (CAS# 137-26-8) in pellet form, about 200 gallons (757 L.) of photochemical fixer solution was steadily pumped through the column at a rate of one gallon (3.8 L.) per hour, thereby allowing the experiment to proceed for about 200 hours. The retention time was about 5 hours. The treated solution exiting the column was filtered using a 1-micron bag filter to yield a precipitate containing silver ions. The bag filter was purchased from Filter Specialist, Inc. The filtered aqueous solution was tested for silver ions using a Perkin Elmer flame atomic absorption spectrometer. The procedure for using such atomic absorption spectrometers to obtain concentrations of metal ions is well known in the art. The filtered aqueous solution contained less than about 10 ppm of silver ions.

What is claimed is:

1. A product obtained from a process, comprising:
reacting the metal ions in an aqueous process solution having a wetting agent with a treatment composition comprising a non-metallic compound to form an organometallic complex precipitate, wherein the reaction is conducted at a temperature of less than or equal to about 50° C.;
separating the organometallic complex precipitate from the aqueous process solution; and
wherein the organometallic complex precipitate includes a small amount of aqueous process solution.

2. The product according to claim 1, wherein the reacting step is conducted at a pH of greater than or equal to about 3.0.

3. The product of claim 1, wherein the non-metallic compound is a thiuram.

4. The product of claim 3, wherein the non-metallic compound is characterized by the general chemical formula (I),

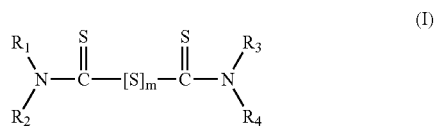

wherein, m is an integer of 1 or 2; and
$R_1$, $R_2$, $R_3$, and $R_4$ are individually selected from the group consisting of C1–C10 linear alkyls, C3–C10 branched alkyls, C3–C10 cyclo-alkyls, and substituted and unsubstituted aryls.

5. The product of claim 4, wherein the non-metallic compound is selected from the group consisting of tetramethylthiuram mono sulfide, bis(dimethyldithiocarbamoyl)

disulfide, tetrabenzylthiuram disulfide, tetraethylthiuram disulfide, tetrabutylthiuram disulfide, dipentamethylenethiuram tetrasulfide, and mixtures thereof.

6. The product of claim 3, wherein the treatment composition further comprises an additional non-metallic compound that is a dithiocarbamate.

7. The product of claim 6, wherein the additional non-metallic compound is characterized by the general chemical formula (II),

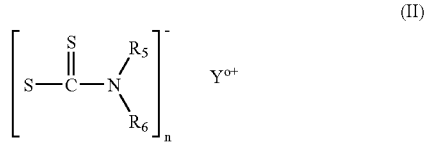

(II)

wherein, n is an integer of 1 or 2;

o is an integer of 1 or 2;

$R_5$ and $R_6$ are individually selected from the group consisting of C1–C10 linear alkyls, C3–C10 branched alkyls, C3–C10 cyclo-alkyls, and substituted and unsubstituted aryls; and Y is an element selected from Groups IA and IIA of the periodic table.

8. The product of claim 7, wherein the additional non-metallic compound is selected from the group consisting of sodium dimethyldithiocarbamate, sodium diethyldithiocarbamate, sodium dibenzyldithiocarbamate, sodium dibutyldithiocarbamate, and mixtures thereof.

9. The product according to any of claims 1, 3 or 6, wherein the metal ion is selected from the group consisting of arsenic, barium, cadmium, chromium, cesium, copper, iron, lead, mercury, nickel, selenium, silver, technetium, thallium, zinc, actinides, lanthanides, mixtures thereof, and alloys thereof.

10. The product according to any of claims 1, 3, or 6, wherein the non-metallic compound is present at a concentration from about 1.0:1.0 to about 1.0:4.0 by molar ratio of non-metallic compound to metal ions in the aqueous process solution.

* * * * *